United States Patent [19]
Bos

[11] Patent Number: 4,635,051
[45] Date of Patent: Jan. 6, 1987

[54] HIGH-SPEED ELECTRO-OPTICAL LIGHT GATE AND FIELD SEQUENTIAL FULL COLOR DISPLAY SYSTEM INCORPORATING SAME

[75] Inventor: Philip J. Bos, Portland, Oreg.

[73] Assignee: Tektronix, Inc., Beaverton, Oreg.

[21] Appl. No.: 535,524

[22] Filed: Sep. 26, 1983

[51] Int. Cl.[4] .............................................. G09G 3/04
[52] U.S. Cl. .................................. 340/757; 340/703; 350/377; 350/408
[58] Field of Search ............... 340/703, 716, 757, 784, 340/795; 350/337, 347 E, 352, 377, 382, 403, 407, 408; 358/61

[56] References Cited

U.S. PATENT DOCUMENTS

| | | | |
|---|---|---|---|
| 2,586,635 | 2/1952 | Fernsler | 350/408 X |
| 2,715,153 | 8/1955 | Sziklai | 350/408 X |
| 2,753,763 | 7/1956 | Haines | 350/408 |
| 3,482,182 | 12/1969 | Kosanke et al. | 350/403 X |
| 3,536,921 | 10/1970 | Caulfield | 350/403 X |
| 3,806,227 | 4/1974 | Greubel et al. | 350/337 |
| 3,838,906 | 10/1974 | Kumada | 350/150 |
| 4,017,156 | 4/1977 | Moriyama et al. | 350/403 X |
| 4,025,164 | 5/1977 | Doriguzzi et al. | 350/408 X |
| 4,061,417 | 12/1977 | Katagiri | 350/352 |
| 4,097,128 | 6/1978 | Matsumoto et al. | 350/347 E X |
| 4,103,260 | 7/1978 | Buchman | 350/403 X |
| 4,239,349 | 12/1980 | Scheffer | 350/337 X |
| 4,241,339 | 12/1980 | Oshiyama | 340/784 X |
| 4,328,493 | 5/1982 | Shanks et al. | 340/784 |
| 4,403,832 | 9/1983 | Tanaka et al. | 350/337 X |
| 4,461,543 | 7/1984 | McMahan | 350/403 X |
| 4,471,351 | 9/1984 | Anderson | 340/795 X |
| 4,497,543 | 2/1985 | Aoki et al. | 350/337 |

OTHER PUBLICATIONS

Tobias, Martin: "International Handbook of Liquid Crystal Displays," OVUM Ltd., London, England, 1975, paragraph 9.5.3, Figs. F9.19 and F9.20.

*Primary Examiner*—Gerald L. Brigance
*Assistant Examiner*—Vincent P. Kovalick
*Attorney, Agent, or Firm*—John D. Winkelman; Paul S. Angello

[57] ABSTRACT

A high-speed electro-optical light gate (40) includes a pair of matched variable optical retarders (54 and 56) positioned between a pair of light polarizing filters (42 and 44) to promote rapid switching between optical transmission states for light rays of the wavelength to which the variable optical retarders are tuned. The projections (62 and 66) of the optic axes of the variable optical retarders are orthogonally aligned so that the response time characteristics of the transitions between optical transmission states of the light gate reflect only the turn-on time response characteristic of the variable optical retarders. A field sequential color display system (78) incorporates a switchable color filter (80) which utilizes the alignment configuration of the variable optical retarders of the light gate to provide light output states of white light and light of three different colors to form an image in full color.

27 Claims, 13 Drawing Figures

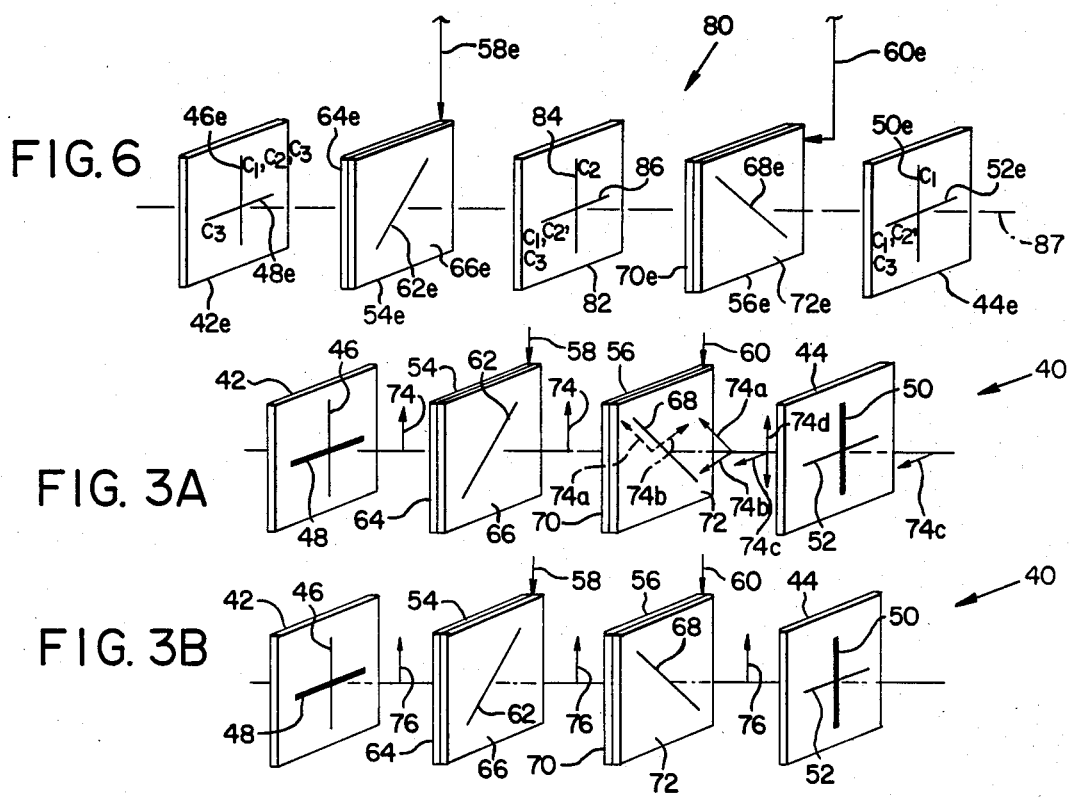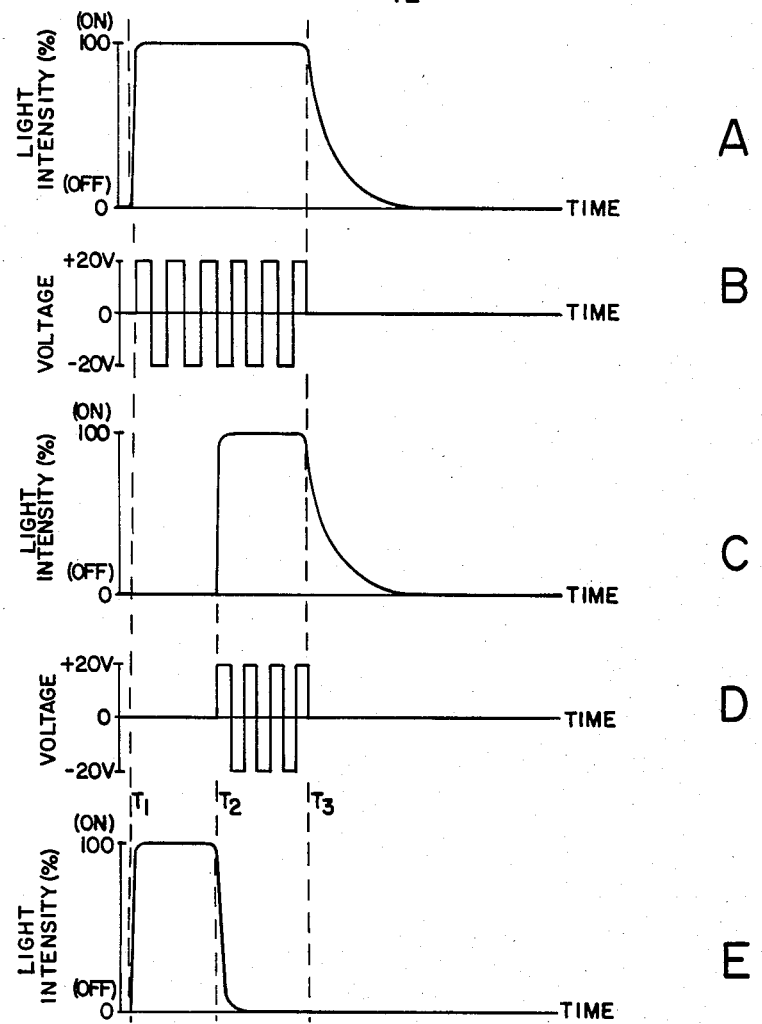

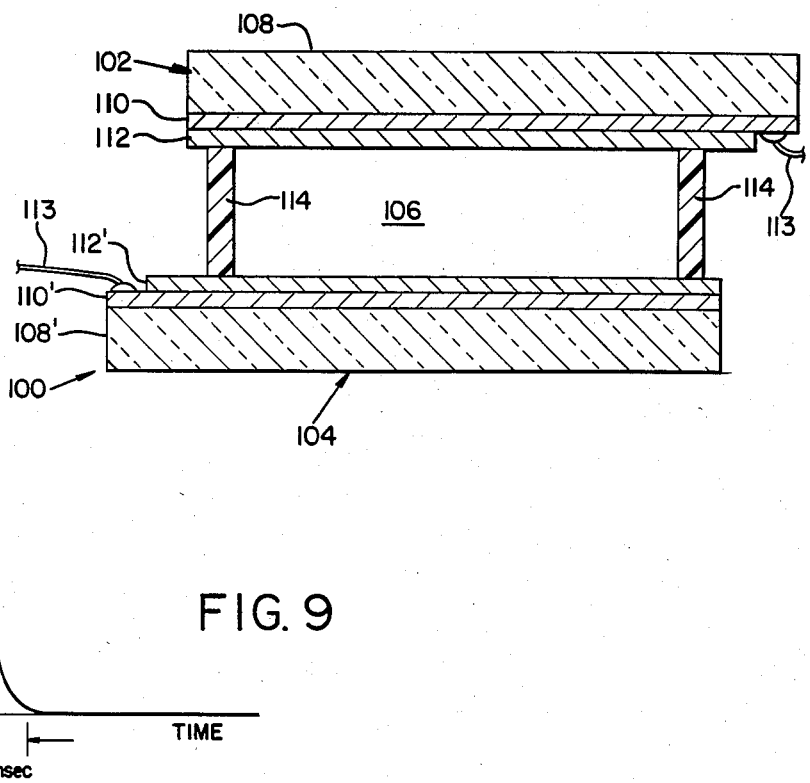
FIG. 7
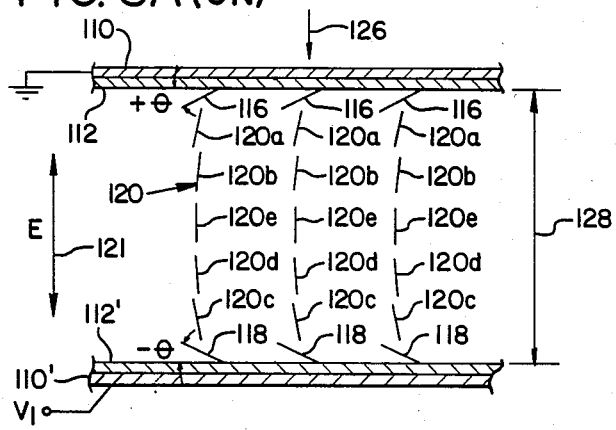
FIG. 9
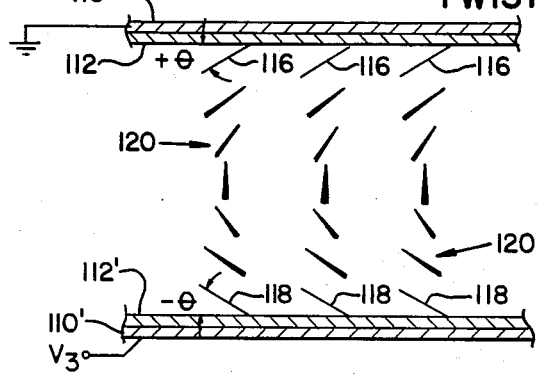
FIG. 8A (ON)
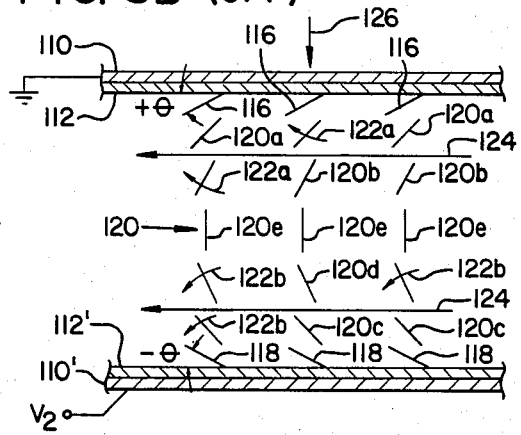
FIG. 8B (OFF)
FIG. 8C (OFF + T₁: π RADIAN TWIST)
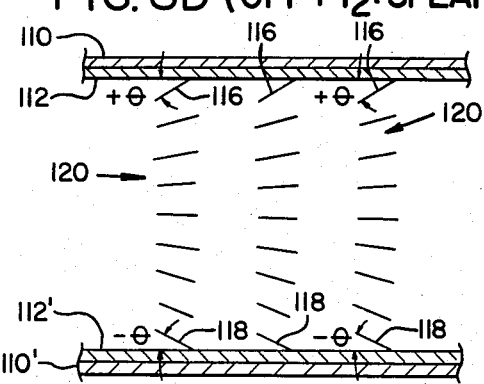
FIG. 8D (OFF + T₂: SPLAYED)

HIGH-SPEED ELECTRO-OPTICAL LIGHT GATE AND FIELD SEQUENTIAL FULL COLOR DISPLAY SYSTEM INCORPORATING SAME

TECHNICAL FIELD

This invention relates to electro-optical switches, and in particular, a high-speed electro-optical light gate which includes a pair of variable optical retarders positioned between a pair of light polarizing filters to enable rapid switching between optical transmission states of light rays of the wavelength to which the variable optical retarders are tuned.

BACKGROUND OF THE INVENTION

High-speed electro-optical light gates have been known heretofore which comprise twisted nematic liquid crystal devices positioned within a light polarizing system to reduce the turn-on and turn-off optical transmission response times of the light gate. Such a light gate is disclosed by Tobias, International Handbook of Liquid Crystal Displays, OVUM Ltd., London, England, 1975, paragraph 9.5.3, FIGS. F9.19 and F9.20. This prior art electro-optical light gate is shown in FIG. 1.

With reference to FIG. 1, the light gate 10 includes a fast shutter 12 positioned in front of a slow auxiliary shutter 14. Fast shutter 12 includes a pair of twisted nematic liquid crystal devices 16 and 18 which are disposed face-to-face and are positioned between a pair of neutral linear polarizing filters 20 and 22. Polarizing filter 20 has vertical absorption axis 24 and horizontal transmission axis 26, and polarizing filter 22 has vertical transmission axis 28 and horizontal absorption axis 30.

Light rays emitted from an external light source (not shown) are received by polarizing filter 20 and exit through polarizing filter 22 of fast shutter 12. Each one of the liquid crystal devices 16 and 18 is optically active and is characterized as having "ON" and "OFF" switching states. In the "ON" state, the presence of a voltage signal of the proper magnitude across the device leaves unchanged the direction of polarization of light rays passing therethrough. In the "OFF" state, the absence of a voltage signal across the device imparts a 90° rotation to the direction of polarization of light rays passing therethrough. The twisted nematic liquid crystal device has a shorter response time when switching from the "OFF" state to the "ON" state (i.e., turn-on time) than that when switching from the "ON" state to the "OFF" state (i.e., turn-off time).

With reference to FIG. 2, both liquid crystal devices 16 and 18 are in the "OFF" state at a time prior to $T_1$ (lines A and B), during which time the light rays passing through horizontal transmission axis 26 of polarizing filter 20 undergo no net change in polarization direction and are completely absorbed by horizontal absorption axis 30 of polarizing filter 22. Prior to time $T_1$, therefore, no light rays exit fast shutter 12 (line C).

At time $T_1$, a 120 volt AC signal is applied to either one of liquid crystal devices 16 and 18 (line A) to rotate by 90° the direction of polarization of light rays passing through horizontal transmission axis 26 of polarizing filter 20 and cause the light rays to exit fast shutter 12 through vertical transmission axis 28 of polarizing filter 22 (line C). The relatively high voltage is utilized to decrease the turn-on time of the liquid crystal device. This is referred to as the transmitting optical transmission state of fast shutter 12.

At time $T_2$, a 120 volt AC signal is applied to the other one of the two liquid crystal devices 16 and 18 (line B) which was not activated at time $T_1$ to provide a net rotation of 0° to the direction of polarization of light rays passing through horizontal transmission axis 26 of polarizing filter 20 and cause the light rays to be completely absorbed by horizontal absorption axis 30 of polarizing filter 22 (line C). This is referred to as the opaque optical transmission state of fast shutter 12.

The transmission and extinction of light rays through fast shutter 12 is accomplished by activating in time sequence both of liquid crystal devices 16 and 18 from the "OFF" states to the "ON" states. The response times for the transitions from the transmitting to the opaque and from the opaque to the transmitting optical transmission states of fast shutter 12 are both characterized by the shorter turn-on time of the liquid crystal device.

The slow auxiliary shutter 14 is positioned at the output of fast shutter 12 to prevent transmission of light through the light gate 10 while liquid crystal devices 16 and 18 relax to the "OFF" states after transmission of light through fast shutter 12 has been terminated. Slow auxiliary shutter 14 includes twisted nematic liquid crystal device 32 which is disposed between polarizing filter 22 and polarizing filter 34. Polarizing filter 22 is an element common to both fast shutter 12 and slow auxiliary shutter 14, and polarizing filter 34 has vertical absorption axis 36 and horizontal transmission axis 38.

The absence of a voltage signal across liquid crystal device 32 imparts a 90° rotation to the direction of polarization of light rays passing through vertical transmission axis 28 of polarizing filter 22 and causes the transmission of the light rays through horizontal transmission axis 38 of polarizing filter 34. This condition exists during the time interval between $T_1$ and $T_2$ and for short time periods prior to time $T_1$ and subsequent to time $T_2$ (line D) to permit transmission of light through light gate 10 (line C).

After the cessation of light transmission through fast shutter 12 (line C) but prior to the removal of the 120 volt AC signals from liquid crystal devices 16 and 18, a 10 volt AC signal is applied to liquid crystal device 32 (line D) to prevent sporadic transmission of light through light gate 10 due to the mismatched turn-off time response characteristics of the liquid crystal devices 16 and 18 after the voltage signal is removed from them at time $T_3$ (lines A and B). The 10 volt AC signal is applied to liquid crystal device 32 prior to time $T_3$ to allow sufficient time for liquid crystal device 32 to reach the "ON" state.

Light gate 10 is capable of high-speed changes in optical transmission for light of all wavelengths. This is accomplished, however, with the use of a large number of optical components which attenuate the intensity of the light rays as they propagate through the light gate. Moreover, the twisted nematic liquid crystal devices incorporated in the fast shutter present a capacitive load which must be overcome by very high voltage AC signals to rapidly switch the devices between the two switching states.

SUMMARY OF THE INVENTION

One of the objects of this invention is to provide a light gate which utilizes low power drive circuitry to rapidly switch light of one wavelength between optical transmission states.

Another object of this invention is to provide such a light gate which includes a pair of variable optical retarders arranged between a pair of polarizing filters so that the projections of the optic axes on the light communicating surfaces of the variable optical retarders are orthogonally aligned to prevent spurious transmission of light through the light gate as the variable optical retarders relax to the substantially half-wave retardation states after the termination of light transmission through the light gate.

Still another object of this invention is to provide such a light gate which eliminates the need for a slow auxiliary shutter to prevent spurious transmission of light as the variable optical retarders relax to substantially half-wave retardation states.

A further object of this invention is to provide a switchable color filter which includes the light gate of the present invention and is utilized in a field sequential display system to provide light output states of white light and light of three different colors to form an image in full color.

The present invention relates to a high-speed electrooptical light gate which receives light from a light source. The light gate includes a pair of variable optical retarding means which are disposed face-to-face and positioned between a pair of light polarizing means. A control means which is in communication with the pair of variable optical retarding means provides first and second optical transmission states. The first optical transmission state provides for the transmission of light coupled through the light gate, and the second optical transmission state provides for the extinction of light coupled through the light gate.

In a preferred embodiment of the light gate of the present invention, each one of the pair of light polarizing means comprises a linear polarizing filter which has two orthogonally related polarization states or axes. Each one of the pair of variable optical retarders or retarding means comprises a zero to substantially half-wave retarder which has a light communicating surface on which its optic axis is projected. The variable optical retarders are arranged within the light gate so that the light communicating surfaces of the optical retarders are disposed in substantially parallel relation and that the projections of the optic axes are orthogonally related and disposed at 45° angles relative to each polarization axis of the linear polarizing filters. Each one of the variable optical retarders is tuned to provide substantially half-wave retardation of light of the same wavelength.

The transmission of light rays through the light gate is selectively controlled by a control means which applies a different output switching signal to each one of the pair of variable optical retarders. The output signal of the control means commands the variable optical retarder to switch to a first ("ON") optical retardation state that produces nearly zero retardation of light passing therethrough or a second ("OFF") optical retardation state that produces substantially half-wave retardation for light of a color or wavelength which is governed by the thickness of the device.

The optical transmission response time characteristics of a variable optical retarder are ascertained by disposing the device between a pair of linear neutral polarizing filters whose transmission axes are in parallel alignment. The turn-on optical transmission response time characteristic is produced when the variable optical retarder is switched from the "OFF" optical retardation state to the "ON" optical retardation state and provides for the transmission of light at the output. The turn-off optical transmission response time characteristic is produced when the variable optical retarder is switched from the "ON" optical retardation state to the "OFF" optical retardation state and provides for the extinction of light at the output. The turn-on optical transmission response time is appreciably shorter than the turn-off optical transmission response time for the preferred liquid crystal variable optical retarder disclosed herein.

It is apparent, therefore, that the turn-on and turn-off optical transmission switching response time characteristics of a variable optical retarder disposed between a pair of parallel neutral polarizing filters represent the respective turn-on and turn-off optical retardation switching response characteristics of the variable optical retarder itself.

To accomplish successful operation of the light gate, the variable optical retarders have substantially matched corresponding optical retardation, and perforce optical transmission, response time characteristics. The light gate is assembled so that the projections of the optic axes on the light communicating surfaces of the variable optical retarders are orthogonally disposed. This arrangement provides a light gate whose transitions from the opaque to the transmitting and from the transmitting to the opaque optical transmission states exhibit the turn-on optical retardation or optical transmission response time characteristic of the matched variable optical retarders.

The light gate of the present invention is also disclosed herein by way of example as an optical subassembly of a switchable color filter which is incorporated in a field sequential color display system to provide light output states of white light and light of three different colors to form an image in full color. The switchable color filter comprises a pair of variable optical retarders of which each one is disposed between a different pair of three color selective linear polarizing filters. In a preferred embodiment of the color display system, each one of the polarizing filters has one polarization axis which transmits light of each one of the primary colors red, green, and blue (i.e., white light) and the other polarization axis which transmits light of one of the primary colors. This arrangement facilitates the production of light output states of three pure colors and white light. The high-speed optical transmission response time characteristics of the light gate are manifested only for light of the wavelength or color to which the variable optical retarders are tuned.

A field sequential color display system incorporating the above-described switchable color filter when synchronized to the frame sequencer provides a flicker-free picture with an image in full color having sharp contrast and great detail.

In the preferred embodiments of the light gate and the field sequential color display system disclosed herein, each variable optical retarder is comprised of a nematic liquid crystal cell which remains disclination-free and switches in a bounce-free manner as it is switched between the two optical retardation states which alter the orientation of the surface noncontacting directors of the liquid crystal material in the cell. The use of a liquid crystal cell of this construction as a variable optical retardation device produces a single-frequency, high-speed switch which requires low power circuitry to produce a superior image in full color which can be observed within a wide range of viewing angles.

Additional objects and advantages of the present invention will be apparent from the following detailed descriptions of preferred embodiments thereof which proceed with reference to the accompanying drawings.

BRIEF DESCRIPTION OF THE DRAWINGS

FIGS. 3A and 3B are diagrams of the high-speed electro-optical light gate of the present invention showing the processing sequence of the light rays traveling through the light gate which is commanded to, respectively, the transmitting and the opaque optical transmission states.

FIG. 4 shows a set of timing diagrams associated with the synthesis of the optical transmission response time characteristic of the electro-optical light gate of the present invention.

FIG. 6 is a diagram of the switchable color filter of the field sequential color display system of FIG. 5 showing the colors of light transmitted through the polarization axes of the three polarizing filters.

FIG. 7 is a diagrammatic cross-sectional side elevation view of the liquid crystal cell which is used as a zero to substantially half-wave optical retarder in accordance with the present invention.

FIGS. 8A, 8B, 8C, and 8D are schematic diagrams of the director alignment configuration of the liquid crystal cell of the zero to substantially half-wave optical retarder incorporated in the preferred embodiments of the present invention in, respectively, the field aligned "ON" state, the partly relaxed "OFF" state, the $\pi$ radian twist state, and the splayed state.

FIG. 9 shows the optical response of a liquid crystal cell of the zero to substantially half-wave optical retarder incorporated in the preferred embodiments of the present invention when switched from the "ON" state to the "OFF" state by the removal of a 20 Vrms AC signal pulse.

DETAILED DESCRIPTION OF PREFERRED EMBODIMENTS

Figure 1:
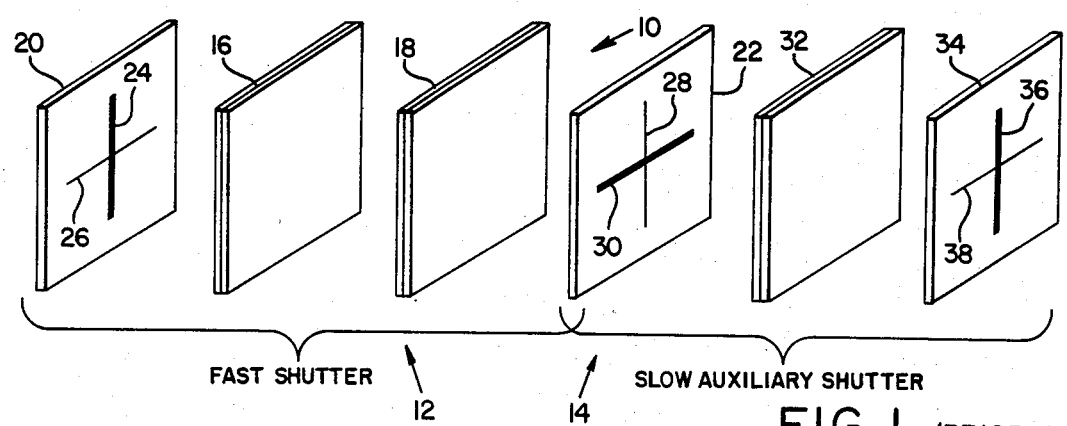
FIG. 1 is a diagram of a prior art electro-optical light gate which includes a fast shutter and a slow auxiliary shutter to reduce the turn-off response time between optical transmission states.
Figure 2:
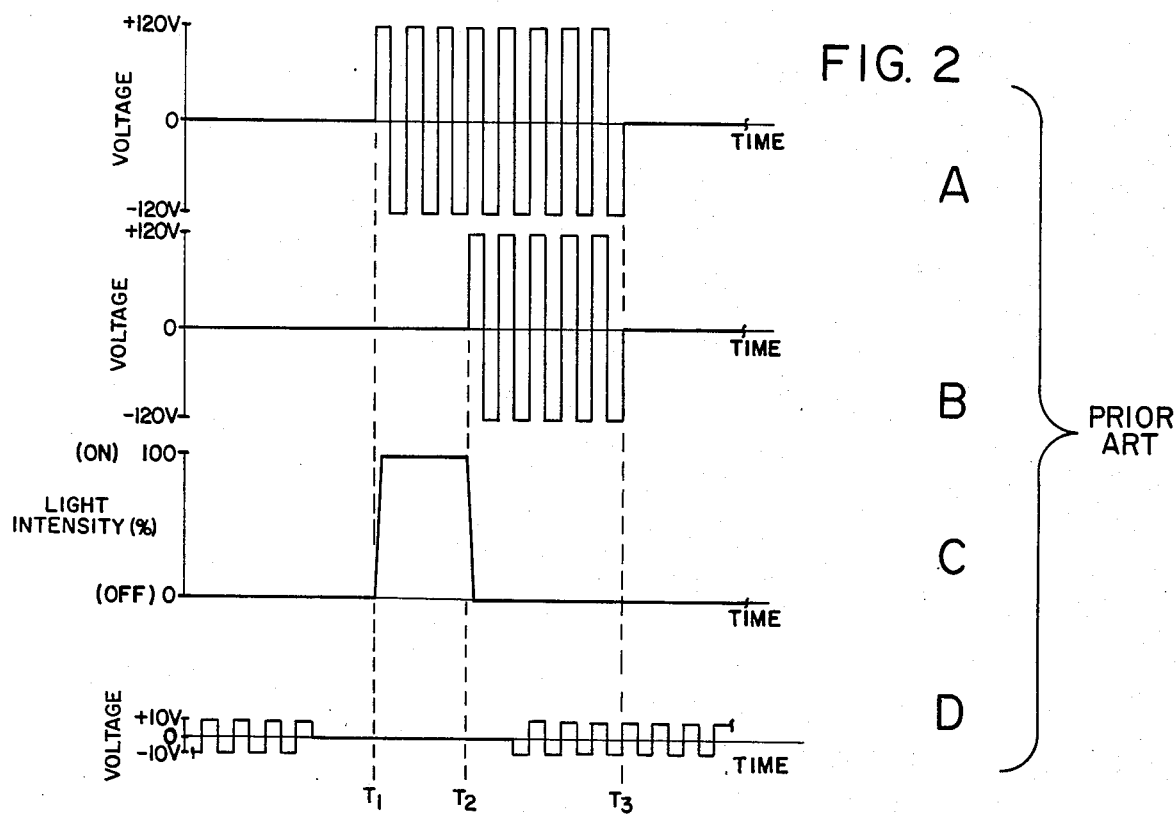
FIG. 2 shows the timing relationship between the application of switching signals to the twisted nematic liquid crystal devices included within the prior art light gate of FIG. 1 and the corresponding changes in light intensity at the output thereof.

Arrangement and Operation of High-Speed Electro-optical Light Gate

With reference to FIGS. 3A and 3B, a high-speed electro-optical light gate 40 designed in accordance with the present invention includes a pair of spaced-apart light polarizing means or neutral linear polarizing filters 42 and 44. Polarizing filter 42 and polarizing filter 44 form, respectively, the input means and the output means of the light gate 40. Polarizing filter 42 has vertical transmission axis 46 and horizontal absorption axis 48, and polarizing filter 44 has vertical absorption axis 50 and horizontal transmission axis 52.

A pair of variable optical retarders or retarding means 54 and 56 are disposed face-to-face and positioned between polarizing filters 42 and 44. Variable optical retarders 54 and 56 comprise zero to substantially half-wave retarders which selectively provide substantially half-wave retardation of light of a predetermined color in response to the respective output signals 58 and 60 of a control circuit or means (not shown).

The term optical retardation insofar as it herein relates and is referred to birefringence is defined by way of the following explanation. A light ray incident on a birefringent device is known to be decomposed into two components known as the ordinary and extraordinary light rays. These components of light travel through the birefringent device at different velocities, and when exiting the device, one of the rays is retarded with respect to the other. Retardation results in a relative phase shift between the two exiting rays, which retardation is also related to the wavelength of the exiting ray of light. For example, a device which has an effective birefringence such that $$\frac{\Delta nd}{\lambda} = \frac{1}{2}$$

is referred to as a half-wave retarder, where $\Delta n$ is the effective birefringence, d is the device thickness, and $\lambda$ is the wavelength of the exiting light ray.

The projection 62 of the optic axis of variable optical retarder 54 on each of its two light communicating surfaces 64 and 66 and the projection 68 of the optic axis of variable optical retarder 56 on each of its two light communicating surfaces 70 and 72 are disposed in substantially parallel relation and are orthogonally aligned. Variable optical retarders 54 and 56 are positioned so that the projections 62 and 68 of the optic axes are disposed at 45° angles relative to each one of the polarization axes of polarizing filters 42 and 44.

FIG. 3A shows the sequential decomposition and processing of a light ray 74 transmitted through light gate 40 when variable optical retarder 54 is commanded to the "ON" optical retardation state by control circuit output 58 to provide nearly zero retardation of all wavelengths of light passing therethrough and variable optical retarder 56 is commanded to the "OFF" optical retardation state by control circuit output 60 to provide substantially half-wave retardation of light of a color which is determined by the thickness of the retarder device. The wavelength of light ray 74 is that to which variable optical retarder 56 is tuned to provide substantially half-wave retardation.

Light ray 74 is transmitted through and vertically polarized by vertical transmission axis 46 of polarizing filter 42. Since variable optical retarder 54 is in the "ON" optical retardation state, the direction of polarization of light ray 74 remains unchanged as it passes therethrough. When light ray 74 strikes light communicating surface 70 of variable optical retarder 56, which is in the "OFF" optical retardation state, it is decomposed into a pair of orthogonally aligned components 74a and 74b. Light ray component 74a is aligned with and light ray component 74b is disposed at right angles to projection 68 of the optic axis. As the light ray components travel through variable optical retarder 56, light ray component 74b is retarded with respect to light ray component 74a and exits the light communicating surface 72 after having been shifted in phase by 180° relative to light ray component 74a.

Both light ray components 74a and 74b can be resolved into vertical and horizontal projections which align with the polarization axes 50 and 52 of polarizing filter 44. The composite horizontal component 74c of the horizontal projections of light ray components 74a and 74b exits the light gate 40 through horizontal transmission axis 52 of polarizing filter 44. The composite vertical component 74d of the vertical projections of light ray components 74a and 74b are 180° out-of-phase and, therefore, cancel each other.

It will be understood that light rays will exit light gate 40 whenever either one of variable optical retarders 54 and 56 is in the "ON" optical retardation state and the other variable optical retarder is in the "OFF" optical retardation state. Biasing the variable optical retarders in the manner described produces the high intensity optical transmission output state of light gate 40.

FIG. 3B shows the processing of a light ray 76 incident on and transmitted through light gate 40 when variable optical retarders 54 and 56 are commanded to the "ON" optical retardation states by the respective control circuit outputs 58 and 60. Light ray 76 undergoes zero optical retardation; therefore, the direction of polarization remains unchanged as light ray 76 travels through light gate 40.

Light ray 76 is transmitted through and vertically polarized by vertical transmission axis 46 of polarizing filter 42. Since its undergoes no change in direction of polarization, light ray 76 is completely absorbed by vertical absorption axis 50 of polarizing filter 44.

It will be understood that light rays will not exit light gate 40 when both of variable optical retarders 54 and 56 are in either the "ON" or the "OFF" optical retardation states. Biasing the variable optical retarders in the manner described produces the no optical transmission output state of light gate 40.

The high-speed optical transmission response time characteristics of light gate 40 are illustrated in FIG. 4. The optical transmission response time characteristics for each one of variable optical retarders 54 and 56 are shown in, respectively, FIG. 4, line A and FIG. 4, line C. The optical transmission response time characteristics for each variable optical retarder are obtained separately by positioning only one variable optical retarder between a pair of linear polarizing filters whose transmission axes are in parallel alignment. Underconditions in which matched variable optical regarders are tuned to provide substantially half-wave retardation of green light ($\lambda = 545$ nm), the corresponding turn-on and turn-off optical transmission response time characteristics for each device are the same, the turn-on response time characteristic indicating approximately a 0.25 millisecond transition time from 10 to 90% light intensity and the turn-off response time characteristic indicating approximately a 1.0 millisecond transition or relaxation time from 90 to 10% light intensity.

With reference to FIG. 4, at time $T_1$ light gate 40 is biased to the 100% light intensity or transmitting optical transmission state, which is depicted in FIG. 3A, when control circuit output 58 provides a 20 volt AC signal to variable optical retarder 54 (line B) and control circuit output 60 provides no signal to variable optical retarder 56 (line D). Since variable optical retarders 54 and 56 are tuned to provide substantially half-wave retardation of green light, green light appears at the output of light gate 40 with the turn-on optical response time characteristic of variable optical retarders 54 and 56 (line E).

At time $T_2$ light gate 40 is biased to the 0% light intensity or opaque optical transmission state, which is depicted in FIG. 3B, when control circuit output 60 applies a 20 volt AC signal to variable optical retarder 56 (line D) and control circuit output 58 continues to apply the 20 volt AC signal to variable optical retarder 54 (line B). The green light is extinguished at the output of light gate 40 with essentially the same turn-on optical transmission response time characteristic of variable optical retarders 54 and 56 (line E).

At time $T_3$, the AC voltage signals are removed from variable optical retarders 54 and 56 to enable relaxation of the devices to the "OFF" optical retardation states and prepare the light gate for reactivation. Light gate 40 may be restarted after variable optical retarder 56 has relaxed to its half-wave retardation state, i.e., 1.0 millisecond. Since the net retardation of the variable optical retarder devices is zero when both are in either the "ON" or the "OFF" optical retardation states, the devices compensate for each other at each point in the relaxation process to maintain the zero net optical retardation. This has the effect of inhibiting the spurious transmission of light during the relaxation process without the use of an auxiliary shutter such as the one required in Tobias' system described hereinabove.

Field Sequential Full Color Display System

Light gate 40 described hereinabove provides a configuration for the components of a switchable color filter of a field sequential color display system which produces light output states of white light and light of three different colors to form an image in full color.

Figure 5:
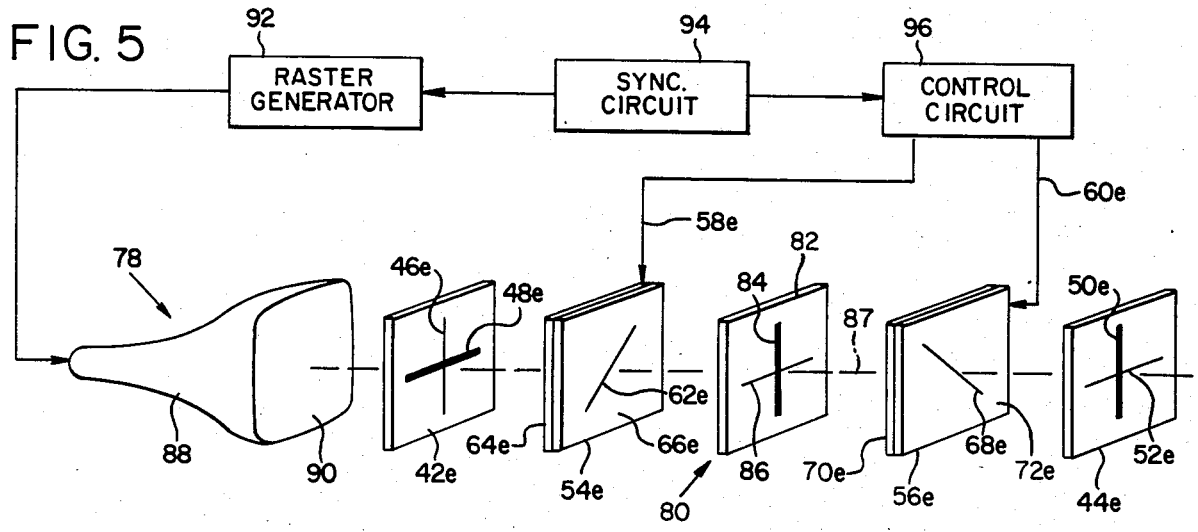
FIG. 5 is a simplified block diagram of a preferred embodiment of a field sequential color display system incorporating a switchable color filter which includes a light polarizing system and a pair of variable optical retarders that function as the high-speed electro-optical switch for light of one wavelength in accordance with the present invention.

With reference to FIG. 5, a field sequential color display system 78 incorporates a switchable color filter 80 which includes optical components of the general type incorporated in light gate 40. Switchable color filter 80 includes the optical components which correspond to those of light gate 40 and are shown in FIGS. 5 and 6 with identical reference numerals followed by a lower case "e" and an additional polarizing filter 82 which is positioned between variable optical retarders 54e and 56e. The three polarizing filters 42e, 82, and 44e have polarization states or axes 48e, 84, and 50e, respectively, which are color selective and polarization states or axes 46e. 86, and 52e, respectively, which pass light of the primary colors $C_1$, $C_2$, and $C_3$ or white light. Horizontal polarization axis 48e of polarizing filter 42e passes light of the color $C_3$; vertical polarization axis 84 of polarizing filter 82 passes light of the color $C_2$; and vertical polarization axis 50e of polarizing filter 44e passes light of the color $C_1$. Variable optical retarders 54e and 56e provide substantially half-wave retardation of light of the color $C_3$ as will be further hereinafter described.

With reference to FIG. 5, the switchable color filter 80 formed by polarizing filters 42e, 82, and 44e and variable optical retarders 54e and 56e is positioned in front of light source 88, which emits light of many wavelengths including those of the primary colors from phosphor screen 90, to produce a light image in the red, green, and blue colors. Light source 88 constitutes a cathode ray tube or a projection device which provides a black and white display image. A signal produced by a raster generator 92 in response to one of the outputs of a frame synchronization circuit or means 94 provides a television type raster scan which presents frames of image information in repetitive sequences of three time intervals.

In the first time interval, information relating to both the form of the image which is to appear in a first color, such as red, and the form of the image which is to appear in a color that is the combination of the color red and second and third colors, such as green and blue, respectively, is written on phosphor screen 90. In the second time interval, information relating to both the form of the image which is to appear in the color green and the form of the image which is to appear in a color that is a combination of the colors red, green, and blue is written on phosphor screen 90. In the third time interval, information relating to both the form of the image which is to appear in the color blue and the form of the image which is to appear in a color that is a combination of the colors red, green, and blue is written on phosphor screen 90.

Control circuit 96 receives at its input a signal from an output of frame synchronization circuit 94 and produces two signals at outputs 58e and 60e to drive the respective variable optical retarders 54e and 56e synchronously with the sequential frame rate of image information produced by light source 88.

The sequentially displayed frames of image information provided in the three time intervals are transmitted through polarizing filter 42e and are synchronously transmitted through polarizing filters 82 and 44e and variable optical retarders 54e and 56e. This provides in each time interval a light image in the color corresponding to the image information presented to the light source. The retinal persistence of the observer's eyes integrates the information exiting polarizing filter 44e during the three intervals of time corresponding to the three frames of the television raster signal to create the impression of a single display image in full color. Intensity modulation of the light image source produces a color gamut over the full spectral range of visible light.

Orientation of Optical Components of Color Display System

FIG. 6 shows the switchable color filter 80 and indicates the colors of light transmitted by each polarization axis of the polarizing filters in accordance with preferred embodiment of the color display system. With reference to FIG. 6, as is the case for the polarization axes of polarizing filters 42e and 44e, polarizing filter 82 is positioned so that its polarization axes are disposed at 45° angles relative to projections 62e and 68e of the respective variable optical retarders 54e and 56e.

Each one of variable optical retarders 54e and 56e is switched between two optical retardation states, the "ON" optical retardation state which provides nearly zero retardation of normally incident light and the "OFF" optical retardation state which provides substantially half-wave retardation for light of a particular predetermined wavelength. The four possible combinations of switching states for the two variable optical retarders provide switchable color filter 80 with four output states for transmitting light of different colors.

In light output state 1, variable optical retarders 54e and 56e are commanded by control circuit outputs 58e and 60e, respectively, to the "ON" optical retardation state and thereby leave unchanged the directions of polarization of light passing therethrough. Light rays incident on vertical polarization axis 46e and horizontal polarization axis 48e of polarizing filter 42e, therefore, become linearly polarized in the vertical and horizontal directions, respectively, and experience no change in polarization direction as they pass through the switchable color filter. Since none of the light rays of the colors $C_1$, $C_2$, and $C_3$ passes through each one of the vertical polarization axes of polarizing filters 42e, 82, and 44e, no light exits the switchable color filter through vertical polarization axis 50e of polarizing filter 44e. Light of only the color $C_3$ is transmitted by each one of the horizontal polarization axes of polarizing filters 42e, 82, and 44e and, therefore, exits the switchable color filter through horizontal polarization axis 52e of polarizing filter 44e.

In light output state 2, variable optical retarder 54e is commanded by control circuit output 58e to the "ON" optical retardation state, and variable optical retarder 56e is commanded by control circuit output 60e to the "OFF" optical retardation state. Since variable optical retarder 54e is in the "ON" optical retardation state, the polarization directions of light rays passing therethrough remain unchanged. Thus, light of the color $C_2$ passes through vertical polarization axis 84, and light of the color $C_3$ passes through horizontal polarization axis 86 of polarizing filter 82.

Commanding variable optical retarder 56e to the "OFF" optical retardation state provides substantially half-wave retardation of light of a predetermined wavelength and separates light rays of all other wavelengths or colors passing therethrough into components which are aligned with the polarization axes of polarizing filter 44e. If variable optical retarder 56e is tuned to provide substantially half-wave retardation of light of the color $C_3$, the direction of polarization of light rays of the color $C_3$ is rotated 90° and the light rays are completely absorbed by vertical polarization axis 50e of polarizing filter 44e. Light rays of the color $C_2$ are separated into components which include major components of light projected onto and passing through horizontal polarization axis 52e and minor components of light projected onto and absorbed by vertical polarization axis 50e of polarizing filter 44e. Light of the color $C_2$, therefore, exits the switchable color filter in light output state 2.

In light output state 3, variable optical retarder 54e is commanded by control circuit output 58e to the "OFF" optical retardation state, and variable optical retarder 56e is commanded by control circuit output 60e to the "ON" optical retardation state. To determine the color of light output provided in light output state 3, it is convenient to take advantage of the reciprocal nature, i.e., the interchangeability of the input and output of the switchable color filter by analyzing the optical processing for light incident on polarizing filter 44e.

Since variable optical retarder 56e is in the "ON" optical retardation state, the polarization directions of light rays passing therethrough remain unchanged. Thus, no light passes through vertical polarization axis 84, and light rays of the colors $C_1$, $C_2$, and $C_3$ pass through horizontal polarization axis 86 of polarizing filter 82.

Commanding variable optical retarder 54e to the "OFF" optical retardation state provides substantially half-wave retardation of light of a predetermined wavelength and separates light rays of all other wavelengths or colors passing therethrough into components which are aligned with the polarization axes of polarizing filter 42e. If variable optical retarder 54e is tuned to provide substantially half-wave retardation of light of the color $C_3$, the direction of polarization of light rays of the color $C_3$ is rotated 90° and the light rays are transmitted through only vertical polarization axis 46e of polarizing filter 42e. Light rays of the colors $C_1$ and $C_2$ are separated into components which include major components of light projected onto and transmitted by vertical polarization axis 46e and minor components of light projected onto and absorbed by horizontal polarization axis 48e of polarizing filter 42e. Light rays of the colors $C_1$, $C_2$, and $C_3$, therefore, are transmitted through the switchable color filter in light output state 3.

In light output state 4, variable optical retarders 54e and 56e are commanded by control circuit outputs 58e and 60e, respectively, to the "OFF" optical retardation states which provide substantially half-wave retardation of the light of the color $C_3$. The orthogonal alignment of the projections 62e and 68e of the optic axes of the variable optical retarders provide essentially zero net retardation for light of the color $C_2$ which is transmitted through both vertical polarization axis 84 and horizontal polarization axis 86 of polarizing filter 82. In light output state 4, therefore, the combination of variable optical retarders 54e and 56e and polarizing filter 82 has no net effect on the optical transmission of light of the color $C_2$. Light of the color $C_2$ passes through vertical polarization axis 46e of polarizing filter 42e and is completely absorbed by vertical polarization axis 50e of polarizing filter 44e. Light of the color $C_2$, therefore, is not transmitted through the switchable color filter in light output state 4.

Light rays of the colors $C_1$, $C_2$, and $C_3$ pass through vertical polarization axis 46e, and light of the color $C_3$ passes through horizontal polarization axis 48e of polarizing filter 42e. Since variable optical retarder 54e is in the "OFF" optical retardation state and is tuned to provide substantially half-wave retardation of light of the color $C_3$, the direction of polarization of light rays of the color $C_3$ is rotated 90° and the light rays are absorbed by vertical polarization axis 84 of polarizing filter 82. Light rays of the colors $C_1$ and $C_3$ are separated into components which include major components of light projected onto and transmitted by horizontal polarization axis 86 and minor components of light projectioned onto and absorbed by vertical polarization axis 84 of polarizing filter 82. As was indicated hereinabove, light rays of the color $C_2$ are not transmitted through the switchable color filter in light output state 4 and need not be further considered.

Since variable optical retarder 56e is in the "OFF" optical retardation state and is tuned to provide substantially half-wave retardation of light of the color $C_3$, the direction of polarization of light rays of the color $C_3$ is rotated 90° and the light rays are absorbed by vertical polarization axis 50e of polarizing filter 44e. Light rays of the color $C_1$ are separated into components which include major components of light projected onto and transmitted by vertical polarization axis 50e and minor components of light projected onto and transmitted through horizontal polarization axis 52e of polarizing filter 44e. Light of the color $C_1$, therefore, exits the switchable color filter in light output state 4.

The four light output states which provide light of three pure colors and white light are summarized in Table I.

TABLE I

| Light Output State | Optical Retardation State of Variable Optical Retarder 54e | Optical Retardation State of Variable Optical Retarder 56e | Color of Light Output |
|---|---|---|---|
| 1 | ON | ON | $C_3$ |
| 2 | ON | OFF | $C_2$ |
| 3 | OFF | ON | $C_1$, $C_2$, $C_3$ |
| 4 | OFF | OFF | $C_1$ |

The best switching speed performance for the switchable color filter described herein is obtained when $C_1$ is assigned the color red, $C_2$ the color green, and $C_3$ the color blue. The switchable color filter of the present invention, therefore, produces in its light output states 1, 2, 3, and 4 blue, green, white, and red light, respectively. Variable optical retarders 54e and 56e provide substantially half-wave retardation of green light.

The above-indicated color selection is made for the following reasons. It has been observed that variable optical retarders which comprise liquid crystal cells of the preferred embodiment described hereinbelow experience the slowest relaxation time for red light. Light output state 4 is selected to transmit red light because both variable optical retarders are switched to the "OFF" optical retardation states. To provide light of a pure red color, green and blue light must be eliminated. The time required for blue light to relax has been determined to be less than that for green light; therefore, green light is selected as the color for which the high-speed switching operation is effected. The orthogonally aligned projections of the optic axes thus provide for green light the high-speed response times as described hereinabove for the light gate. The relaxation time of blue light, therefore, is the rate limiting factor as respects the switching response time of the switchable color filter.

The preferred embodiment described hereinabove provides light output states of white light and light of three pure colors when polarizing filters 42e and 44e are interchanged without changing the orientation of their polarization axes relative to the projections 62e and 68e of the optic axes.

It will be understood that although the preferred embodiment of the switchable color filter described herein incorporates polarizing filters characterized in that each one passes light of the three primary colors, polarizing filters which pass light of other colors and colors which are different from the ones passed by the other polarizing filters may be utilized to produce light output states of three colors. The variable optical retarders can be tuned to provide substantially half-wave retardation of light of colors which are different from the primary colors.

Liquid Crystal Variable Optical Retarder

The preferred embodiments of light gate 40 and color display system 78 of the present invention incorporate a pair of liquid crystal cells operating as zero to substantially half-wave optical retarders. Each such liquid crystal cell controls the retardation of light passing therethrough in response to the intensity of an electric field produced by an excitation voltage applied to the cell electrode structures.

With reference to FIG. 7, a liquid crystal cell 100 includes a pair of generally parallel, spaced-apart electrode structures 102 and 104 with nematic liquid crystal material 106 included therebetween. Electrode structure 102 comprises glass dielectric substrate 108 which has on its inner surface a layer 110 of electrically conducting, but optically transparent, material such as indium tin oxide. Director alignment film layer 112 is applied to conductive layer 110 and forms a boundary between electrode structure 102 and liquid crystal material 106. The surface of film 112 which contacts the liquid crystal material is conditioned in accordance with one of two preferred methods to promote a preferred orientation of the directors of the liquid crystal material in contact therewith. The materials constituting and the corresponding methods of conditioning the director alignment film 112 are described in detail hereinbelow. Electrode structure 104 is of a construction similar to that of electrode structure 102, and the components corresponding to those of electrode structure 102 are shown with identical reference numerals followed by primes.

The short length edges of electrode structures 102 and 104 are offset relative to each other to provide access to conductive layers 110 and 110' for connecting at terminals 113 the conductors of a selected output of control circuit 96 of color display system 78. (References made herein to control circuit 96 are intended only to suggest one exemplary source of excitation voltages to drive liquid crystal cell 100. The discussion is also applicable to an output of the control circuit of light gate 40.) Spacers 114 may be comprised of any suitable material such as glass fiber to preserve the general parallel relation between electrode structures 102 and 104.

With reference to FIGS. 8A–8D, the nematic director alignment configuration of layers 112 and 112' in liquid crystal cell 100 is described in Column 7, lines 48–55, of U.S. Pat. No. 4,333,708 of Boyd, et al. It will be understood, however, that the liquid crystal cell described in the Boyd, et al. patent differs from that of the present invention in that the former includes an alternating-tilt geometry type configuration of which the director alignment of cell 100 comprises only a portion. The cell of the Boyd, et al. patent is constructed to promote disclination movement within the cell in an attempt to provide a bistable switching device.

The film layer 112 of electrode structure 102 is conditioned so that the electrode structure surface contacting directors 116 are aligned parallel to each other at a tilt bias angle $+\theta$, which is measured in the counterclockwise sense with reference to the surface of film layer 112. The film layer 112' of electrode structure 104 is conditioned so that the electrode structure surface contacting directors 118 are aligned parallel to each other at a tilt bias angle $-\theta$ which is measured in the clockwise sense with reference to the surface of film layer 112'. Thus, liquid crystal cell 100 is fabricated so that the surface contacting directors 116 and 118 of the opposed surfaces of director alignment layers 112 and 112' of electrode structures 102 and 104, respectively, are tilt-biased in opposite directions.

A first preferred method of effecting the desired alignment of the surface contacting directors entails the use of polyimide as the material which comprises the alignment film layers 112 and 112' on electrode structures 102 and 104, respectively. Each alignment film layer is rubbed to produce a tilt bias angle $|\theta|$, with 2° to 5° being the preferred range. A second preferred method of effecting the desired alignment of the surface contacting directors entails the use of silicon monoxide as the material which comprises the alignment film layers 112 and 112' of electrode structures 102 and 104, respectively. The silicon monoxide layer is evaporated and vapor deposited preferably at a 5° angle measured from the electrode structure surface in an amount sufficient to produce a tilt bias angle $|\theta|$ of between 10° to 30°, with 15° to 25° being the preferred range.

It will be appreciated that methods for depositing silicon monoxide or other alignment materials to align liquid crystal molecules in a predetermined direction have been disclosed previously by others and are known to those having ordinary skill in the art. One such method, for example, is disclosed in U.S. Pat. No. 4,165,923 of Janning.

FIG. 8A depicts the orientation of surface noncontacting directors 120 when an AC signal $V_1$ of approximately 2 kHz and 20 Vrms is applied to conductive layers 110 and 110' of electrode structures 102 and 104, respectively. The signal $V_1$ on conductive layer 110' constitutes a first switching state produced at the selected output of control circuit 96 and produces an alternating electric field, E, between electrode structures 102 and 104 within the liquid crystal cell 100 to force the cell into its "ON" optical retardation state. A substantial number of the surface noncontacting directors 120 of a liquid crystal material 106 which has a positive anisotropy value align essentially end-to-end along direction 121 of the electric field flux lines within the cell, which direction is normal to the conditioned surfaces of the electrode structures. Thus, when cell 100 is excited into its "ON" state, the surface noncontacting directors 120 are aligned perpendicularly to the surfaces of the cell. It should be noted that the surface contacting directors 116 and 118 substantially maintain their tilt bias angles $|\theta|$ in the two topological states of the cell, the first of which states is shown in FIGS. 8A to 8C and the second of which states is shown in FIG. 8D.

FIG. 8B depicts the orientation of surface noncontacting directors 120 after the signal $V_1$ is removed so that the alignment of surface noncontacting directors is influenced not by an electric field produced between electrode structures 102 and 104 within the cell, but by the intermolecular elastic forces which cause relaxation of the surface noncontacting directors from the end-to-end alignment of the "ON" state. The removal of signal $V_1$ constitutes a second switching state produced at the selected output of control circuit 96. The director orientation shown in FIG. 8B corresponds to that of the "OFF" optical retardation state of the cell.

Switching cell 100 to the "OFF" state can also be accomplished by applying to the cell an AC signal $V_2$ produced at the selected output of control circuit 96 having a voltage level which is less than that of signal $V_1$ and generally about 0.1 V. The frequency of signal $V_2$ is generally the same as that of signal $V_1$.

During the transition from the "ON" state to the "OFF" state of the liquid crystal cell, the surface noncontacting directors recede from the end-to-end alignment normal to the electrode structure surfaces and attempt to assume a generally parallel relation with the adjacent directors. Thus, surface noncontacting directors 120a and 120b rotate in a clockwise sense as shown by direction arrows 122a in order to achieve a near-parallel relation as respects directors 116 and 120a, respectively; and surface noncontacting directors 120c and 120d rotate in a counterclockwise sense as shown by direction arrows 122b to achieve a near-parallel relation as respects directors 118 and 120c, respectively. Thus, when cell 100 relaxes to its "OFF" state, each one of a substantial number of the surface noncontacting directors is aligned so that it projects a director component onto the surfaces of the cell. The surface noncontacting directors, however, lie approximately in a plane which is perpendicular to the surfaces of the cell.

It should be noted that the surface geometry of cell 100 differs from that of a conventional liquid crystal variable retardation cell such as the one described in the publication "Transient Behavior of Twisted Nematic Liquid-Crystal Layer in an Electric Field," *Journal De Physique*, Vol. 36, pp. Cl-261–Cl-263 by C. F. Van Doorn in which the tilt bias angles are of the same rotational sense as measured from the inner surfaces of the electrode structure. The surface contacting director configuration of cell 100 induces rapid surface noncontacting director relaxation without any optical bounce from the "ON" state to the "OFF" state. It is presently believed that the rapid, optical bounce-free director relaxation is caused by the flow of liquid crystal material in the same direction 124 along both conditioned surfaces of the cell. Such unidirectional flow does not occur in the conventional cell described in the publication by Van Doorn which cell experiences liquid crystal material flow in opposite directions along the conditioned surfaces. The beneficial effect of the unidirectional material flow in cell 100 is that no "reverse" torque is applied to the centrally located surface noncontacting directors 120e by such flow in the relaxing cell. The result is that bounce-free, rapid electro-optical switching is achieved.

FIG. 8C depicts the orientation of the directors after a time $T_1$ during which liquid crystal cell 100 is allowed to relax further beyond the "OFF" state shown in FIG. 8B. This will occur generally if an electric field is not reintroduced within the cell after approximately 50 milliseconds has elapsed from the time the electric field had been removed. The director configuration of the cell shown in FIG. 8C is characterized in that the surface noncontacting directors 120 relinquish their planar configuration and assume what is referred to as a $\pi$ radian twist or helical configuration. With further relaxation, the cell in the $\pi$ radian twist configuration will experience disclination movement and degenerate over a time period $T_2$ of approximately several minutes to the splayed configuration depicted in FIG. 8D. It should be noted that the periodic application of an AC signal $V_3$ of approximately 1.0 V to the cell will prevent further relaxation of the surface noncontacting directors to the $\pi$ radian twist state.

The method of operating the liquid crystal cell 100 as a zero to substantially half-wave optical retarder is directed to the disclination-free surface noncontacting director relaxation from the electric field aligned or "ON" state depicted by FIG. 8A to the planar configuration or "OFF" state depicted by FIG. 8B.

In the present invention, liquid crystal cell 100 is operated as a zero to substantially half-wave optical retarder whose optic axis corresponds to the alignment direction of the nonsurface contacting directors 120.

Linearly polarized light which propagates in direction 126 normal to the surfaces of electrode structures 102 and 104 is coincident with the direction of surface noncontacting directors 120 when the liquid crystal cell is in the "ON" state. Directors 120 are oriented in such "ON" state so that there is a negligible projection of the optic axis on the electrode structure surfaces of the cell. Under these conditions, liquid crystal cell 100 produces substantially reduced optical retardation for incident light propagating in the direction 126.

Linearly polarized light which propagates in direction 126 normal to the surfaces of electrode structures 102 and 104 is noncoincident with the alignment direction of surface noncontacting directors when the liquid crystal cell is in the "OFF" state. Directors 120 are oriented in such "OFF" state so that each one of a substantial number of them projects a component on the electrode structure surfaces of the cell. Under these conditions, liquid crystal cell 100 has an effective birefringence for generally normally incident light. The orientation of surface noncontacting directors 120 provides substantially half-wave optical retardation for light of the wavelength which satisfies the mathematical expression:

$$\frac{\Delta nd}{\lambda} = \frac{1}{2}$$

where d represents the thickness 128 and $\Delta n$ represents the effective birefringence of the cell.

With reference to FIG. 9, the optical transmission response of a liquid crystal cell which is disposed between a pair of neutral polarizing filters having their transmission axes in parallel alignment is shown to provide approximately a 1.0 millisecond transition time between the "ON" and the "OFF" optical retardation states of the cell. This response time was accomplished with a cell fabricated with E-44 type liquid crystal material manufactured by BDH Chemicals Ltd. of Poole, England, of 3 micron thickness and driven by a +20 Vrms 2 kHz pulse. This relatively fast optical response is attributed to the elimination of optical bounce that has been accomplished by virtue of the promotion of unidirectional flow of liquid crystal material within the cell during surface noncontacting director realignment which occurs between the transition from the "ON" state to the "OFF" state.

It will be obvious to those having skill in the art that many changes may be made in the above-described details of the preferred embodiments of the present invention. The scope of the present invention, therefore, should be determined only by the following claims.

I claim:

1. A high-speed electrooptical light gate which receives light from a light source, comprising:
   a pair of variable optical retarding means positioned between a pair of spaced-apart light polarizing means,
   each one of the pair of variable optical retarding means including a liquid crystal cell that comprises liquid crystal material which has directors and is contained between a pair of generally parallel electrode structures, each electrode structure including a director alignment layer which has been conditioned so that the directors of the liquid crystal material in contact therewith become substantially uniformly aligned to form tilt bias angles with the conditioned surfaces, the tilt bias angles of the directors in contact with one conditioned surface being defined in a rotational sense opposite to the tilt bias angles of the directors in contact with the other conditioned surface, and
   each one of the pair of variable optical retarding means having an optic axis and a light communicating surface on which the optic axis is projected, the pair of variable optical retarding means being arranged so that the projections of the optic axes on the light communicating surfaces are orthogonally related; and control means in communication with the pair of variable optical retarding means to provide first and second optical transmission states, the first optical transmission state providing for the transmission of light coupled through the light gate and the second optical transmission state providing for the extinction of light coupled through the light gate.

2. The light gate of claim 1 in which each one of the light polarizing means has two orthogonally related polarization axes of which each polarization axis is disposed at 45° angles relative to both of the projections of the optic axes.

3. The light gate of claim 1 in which each one of the pair of variable optical retarding means comprises a zero to substantially half-wave retarder.

4. The light gate of claim 3 in which each one of the pair of variable optical retarding means is tuned to provide substantially half-wave retardation of light of a predetermined wavelength, the predetermined wavelength being the same for both variable optical retarding means of the pair.

5. A switchable color filter which receives light from a light source having plural light components that can be combined to form white light, comprising:

three color selective polarizing means in optical communication with the light source;

a pair of variable optical retarding means positioned so that each one of the pair of variable optical retarding means is disposed between a different pair of the three color selective polarizing means, each one of the pair of variable optical retarding means having an optic axis and a light communicating surface on which the optic axis is projected and the pair of variable optical retarding means being arranged so that the light communicating surfaces thereof are disposed in substantially parallel relation and that the projections of the optic axes are orthogonally related; and control means in communication with the pair of variable optical retarding means to selectively transmit a light output of one of three colors or white light.

6. The switchable color filter of claim 5 in which one of the three color selective polarizing means is disposed between the pair of variable optical retarding means and has two orthogonally related polarization states which concurrently transmit light of a common color.

7. The switchable color filter of claim 5 in which each one of the three color selective polarizing means has two orthogonally related polarization states of which one polarization state transmits white light and the other polarization state transmits light of one color.

8. The switchable color filter of claim 7 in which each one of the polarization states of the three color selective polarizing means comprises a polarization axis which is disposed at 45° angles relative to the projections of the optic axes.

9. The switchable color filter of claim 5 in which each one of the pair of variable optical retarding means comprises a zero to substantially half-wave retarder.

10. The switchable color filter of claim 9 in which each one of the pair of zero to substantially half-wave retarders is tuned to provide substantially half-wave retardation of light of a predetermined wavelength, the predetermined wavelength being the same for both variable optical retarding means of the pair.

11. The switchable color filter of claim 5 in which each one of the color selective polarizing means comprises a linear polarizing filter.

12. A field sequential color display system which receives light from a light source having plural light components that can be combined to form white light, comprising:

image information generating means in communication with the light source to produce light image information;

three color selective polarizing means in optical communication with the light source;

a pair of variable optical retarding means positioned so that each one of the pair of variable optical retarding means is disposed between a different pair of the three color selective polarizing means, each one of the pair of variable optical retarding means having an optic axis and a light communicating surface on which the optic axis is projected and the pair of variable optical retarding means being arranged so that the light communicating surfaces thereof are disposed in substantially parallel relation and that the projections of the optic axes are orthogonally related;

control means in communication with the pair of variable optical retarding means to selectively transmit a light output of one of three colors or white light; and synchronizing means to synchronize a light output of one of the three colors or white light with a predetermined one of the light image information to provide a light image in a desired color.

13. The color display system of claim 12 in which one of the three color selective polarizing means is disposed between the pair of variable optical retarding means and has two orthogonally related polarization states which concurrently transmit light of a common color.

14. The color display system of claim 12 in which each one of the three color selective polarizing means has two orthogonally related polarization states of which one polarization state transmits white light and the other polarization state transmits light of one color.

15. The color display system of claim 14 in which each one of the polarization states of the three color selective polarizing means comprises a polarization axis which is disposed at 45° angles relative to the projections of the optic axes.

16. The color display system of claim 12 in which each one of the pair of variable optical retarding means comprises a zero to substantially half-wave optical retarder.

17. The color display system of claim 16 which each one of the pair of zero to substantially half-wave retarders is tuned to provide substantially half-wave retardation of light of a predetermined wavelength, the predetermined wavelength being the same for both variable optical retarding means of the pair.

18. The color display system of claim 12 in which each one of the color selective polarizing means comprises a linear polarizing filter.

19. The color display system of claim 12 in which each one of the variable optical retarding means includes a liquid crystal cell comprising liquid crystal material which has directors and is contained between a pair of generally parallel electrode structures, each electrode structure including a director alignment layer which has been conditioned so that the directors of the liquid crystal material in contact therewith become substantially uniformly aligned to form tilt bias angles with the conditioned surfaces, the tilt bias angles of the directors in contact with one conditioned surface being defined in a rotational sense opposite to the tilt bias angles of the directors in contact with the other conditioned surface.

20. A high-speed electro-optical light gate which receives light from a light source and modulates the intensity of the light between transmitting and opaque optical transmission states, comprising:

a pair of spaced-apart light polarizing means;

first and second variable optical retarding means positioned between the pair of light polarizing means and having a turn-on response time characteristic when switching from a first retardation state to a second retardation state, the first retardation state providing a greater amount of retardation than that of the second retardation state, each of the first and second variable optical retarding means having an optic axis and a light communicating surface on which the optic axis is projected, the first and second variable optical retarding means being arranged so that the projections of the optic axes on the light communicating surfaces are orthogonally related; and control means operable for commanding the first variable retarding means to the first retardation state and the second variable optical retarding means to the second retardation state to effect a transition from the opaque state to the transmitting state with a response time characteristic that is substantially the same as the turn-on response time characteristic, and for commanding the first and second variable optical retarding means to the second retardation state to effect a transition from the transmitting state to the opaque state with a response time characteristic that is substantially the same as the turn-on response time characteristic.

21. The light gate of claim 20 in which the first retardation state provides substantially half-wave retardation.

22. The light gate of claim 20 in which the second retardation state provides essentially zero retardation.

23. The light gate of claim 20 in which the first retardation state provides substantially half-wave retardation and the second retardation state provides essentially zero retardation.

24. The light gate of claim 20 in which each one of the pair of light polarizing means has two orthogonally aligned polarization axes of which each polarization axis is disposed at 45° angles relative to both of the projections of the optic axes.

25. The light gate of claim 24 in which each one of the pair of light polarizing means comprises a neutral linear polarizing filter with a transmission axis, the transmission axes of the linear polarizing filters being orthogonally aligned.

26. The light gate of claim 20 in which each of the first and second variable optical retarding means is tuned to provide substantially half-wave retardation of light of a predetermined wavelength, the predetermined wavelength being the same for both the first and second variable optical retarding means.

27. The light gate of claim 20 in which each of the first and second variable optical retarding means includes a liquid crystal cell comprising liquid crystal material which has directors and is contained between a pair of generally parallel electrode structures, each electrode structure including a director alignment layer which has been conditioned so that the directors of the liquid crystal material in contact therewith become substantially uniformly aligned to form tilt bias angles with the conditioned surfaces, the tilt bias angles of the directors in contact with one conditioned surface being defined in a rotational sense opposite to the tilt bias angles of the directors in contact with the other conditioned surface.

* * * * *